Fig. 1

W. W. STOPPLE.
BALING PRESS.
APPLICATION FILED OCT. 25, 1910.

1,003,382.

Patented Sept. 12, 1911.
10 SHEETS—SHEET 5.

Fig. 5.

Witnesses

Inventor
Walter W. Stopple
By E. E. Vrooman, Attorney

W. W. STOPPLE.
BALING PRESS.
APPLICATION FILED OCT. 25, 1910.

1,003,382.

Patented Sept. 12, 1911.
10 SHEETS—SHEET 7.

W. W. STOPPLE.
BALING PRESS.
APPLICATION FILED OCT. 25, 1910.

1,003,382.

Patented Sept. 12, 1911.
10 SHEETS—SHEET 9.

Witnesses

Inventor
Walter W. Stopple.
By E. E. Vrooman,
his Attorney.

W. W. STOPPLE.
BALING PRESS.
APPLICATION FILED OCT. 25, 1910.

1,003,382.

Patented Sept. 12, 1911.
10 SHEETS—SHEET 10.

Witnesses

Inventor
Walter W. Stopple.

UNITED STATES PATENT OFFICE.

WALTER W. STOPPLE, OF ALMA, MICHIGAN, ASSIGNOR TO LITTLE GIANT HAY PRESS COMPANY, OF ALMA, MICHIGAN, A CORPORATION.

BALING-PRESS.

1,003,382.     Specification of Letters Patent.     Patented Sept. 12, 1911.

Application filed October 25, 1910. Serial No. 589,070.

*To all whom it may concern:*

Be it known that I, WALTER W. STOPPLE, a citizen of the United States of America, residing at Alma, in the county of Gratiot and State of Michigan, having invented certain new and useful Improvements in Baling-Presses, of which the following is a specification, reference being had therein to the accompanying drawing.

This invention relates to baling presses especially adapted for use within buildings for pressing material, such as paper, into bales to facilitate shipping of the same.

The principal object is to produce a baling press that will occupy the minimum of floor space and which is so constructed that a fire within the press cannot get beyond the press, and a fire within the room in which the press is stationed, cannot gain access to the contents.

In carrying out the objects of the invention generally stated above, it is contemplated providing a strong and serviceable structure which includes a supporting frame which has a charging hopper at the upper portion, and a body formed of front and rear doors and end panels, the doors and panels being so connected to the frame that when closed provide a tight and rigid body which will withstand the maximum of pressure from the inside, such as is incidental to the forming of a bale, and which, when opened, expand so that a bale can be readily removed.

In addition to the foregoing prominent features of the invention, the improved press includes a novel bottom for the press in which means are provided which permit the bale ties to be readily passed under the bottom of a bale, a plunger which is also provided with means which permit the bale ties to be passed over the bale, and novel means for operating the plunger which can be readily operated to "set" the plunger upon the top of the material to be baled, and then operated to place the material under compression to form a tight and compact bale.

In carrying out the invention as generally stated above, it will be understood, of course, that the elements thereof are necessarily susceptible of a wide latitude as to structural arrangements and details of parts, but one simple and practical embodiment is set forth in the accompanying drawings which illustrate a practical press embodying the principles of this invention.

In said drawings: Fig. 4 is a similar view of the opposite end of the press.

Figure 1:
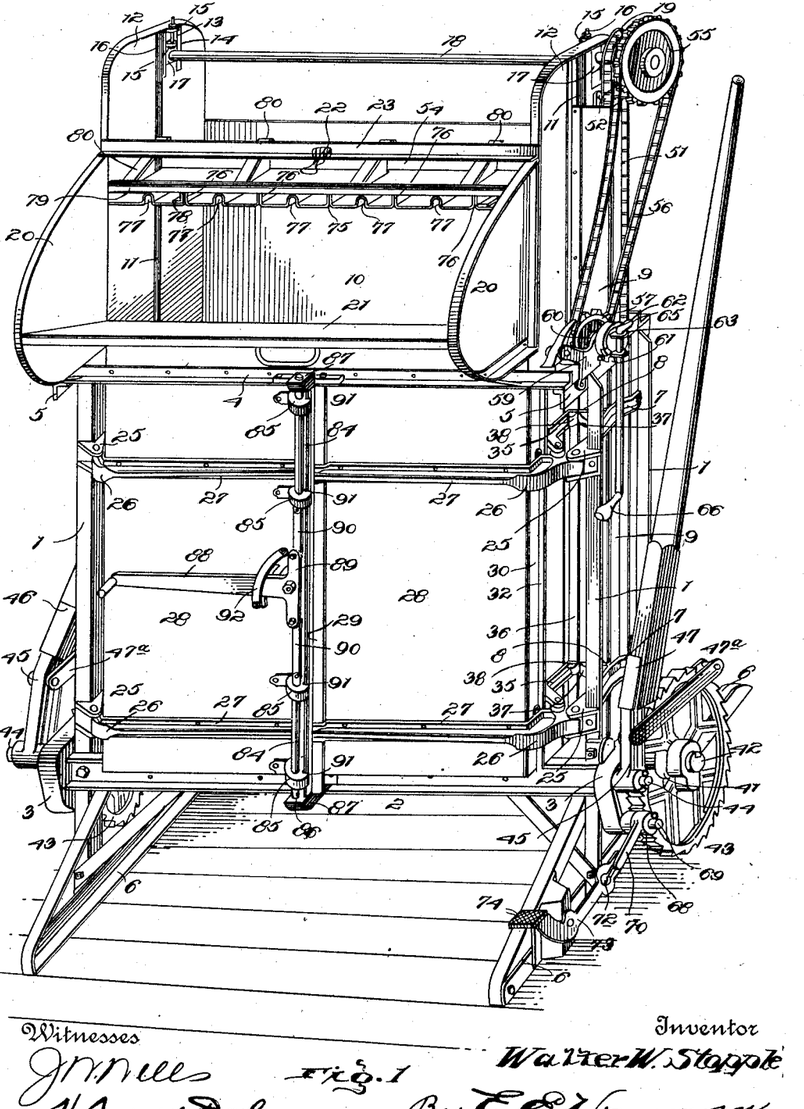
—Figure 1 is a perspective view of the improved baling press.
Figure 2:
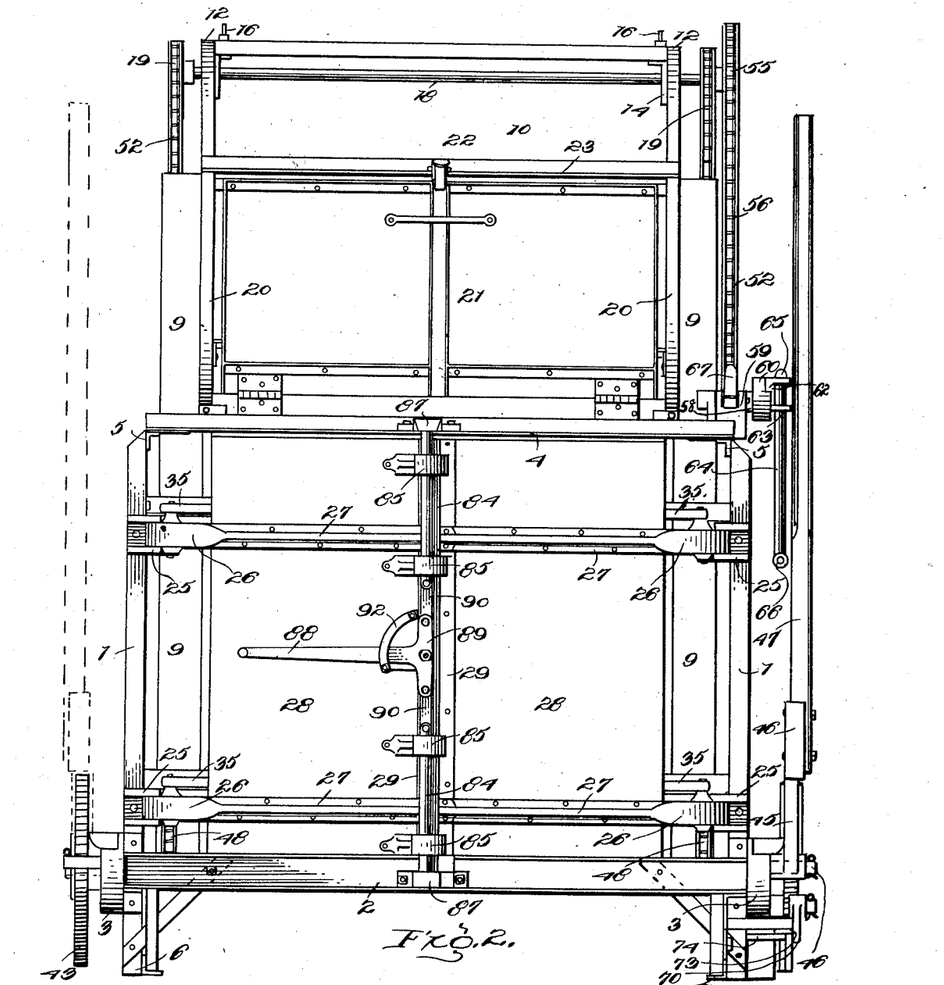
Fig. 2 is a front view thereof.
Figure 3:
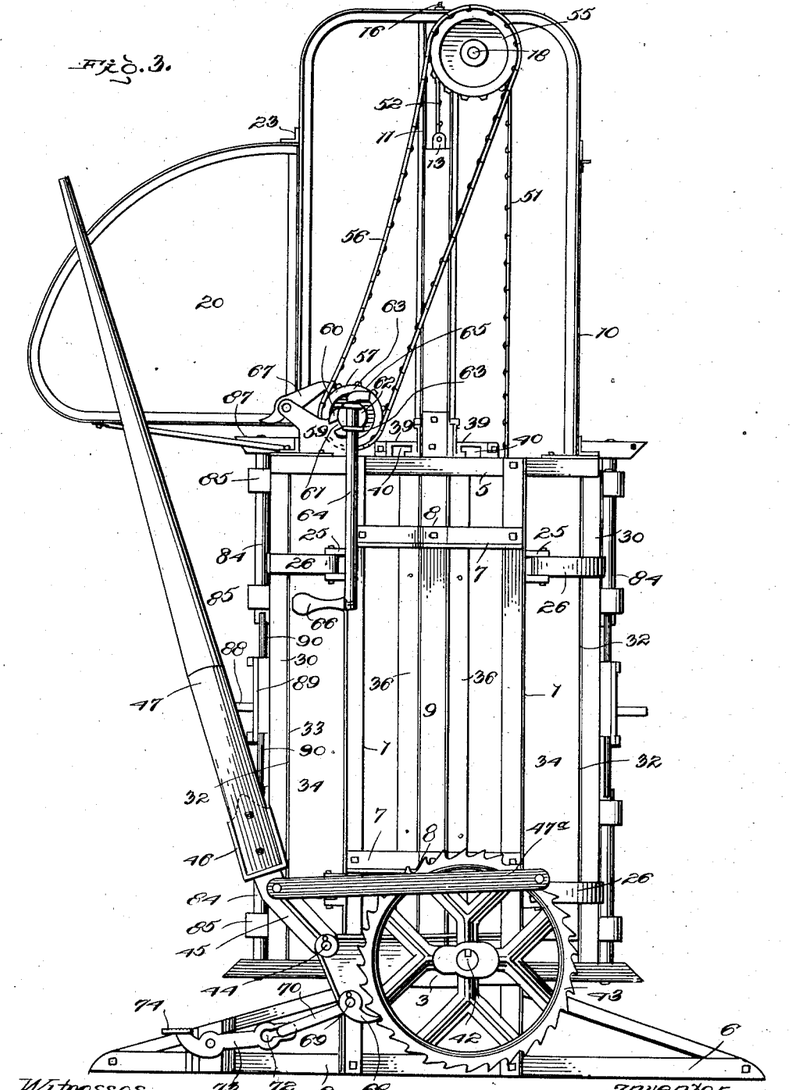
Fig. 3 is a view in elevation of one end of the press.
Figure 5:
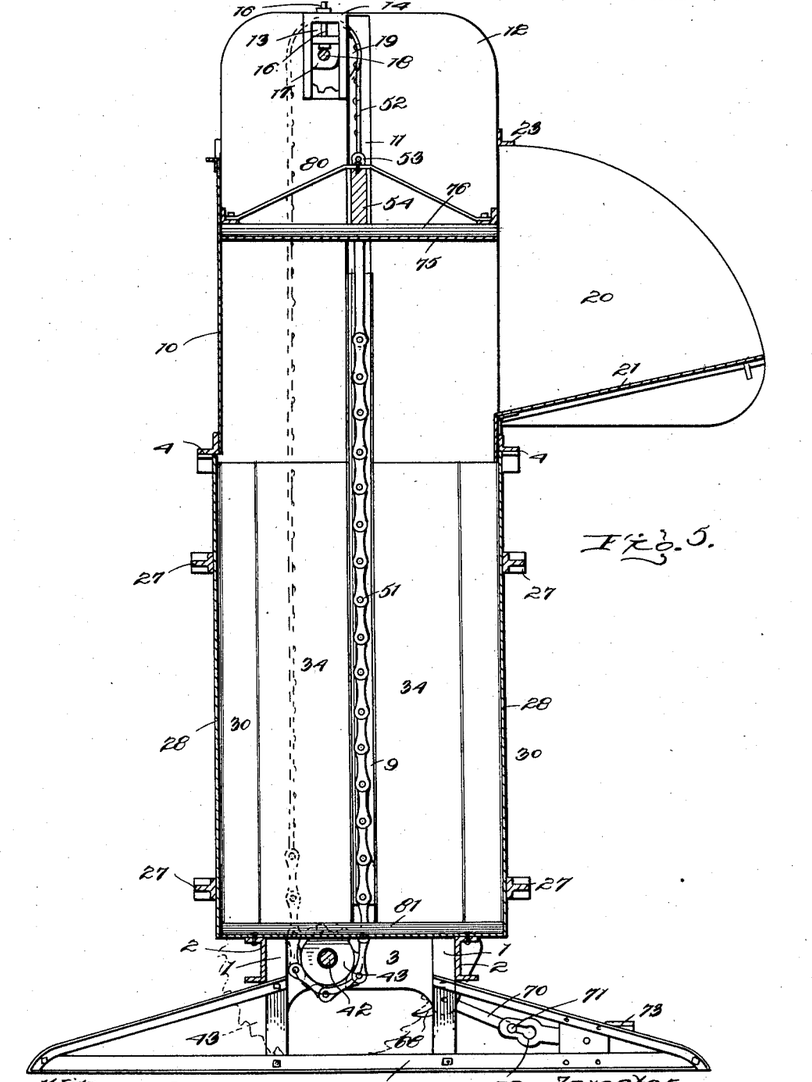
Fig. 5 is a transverse vertical sectional view.
Figure 6:
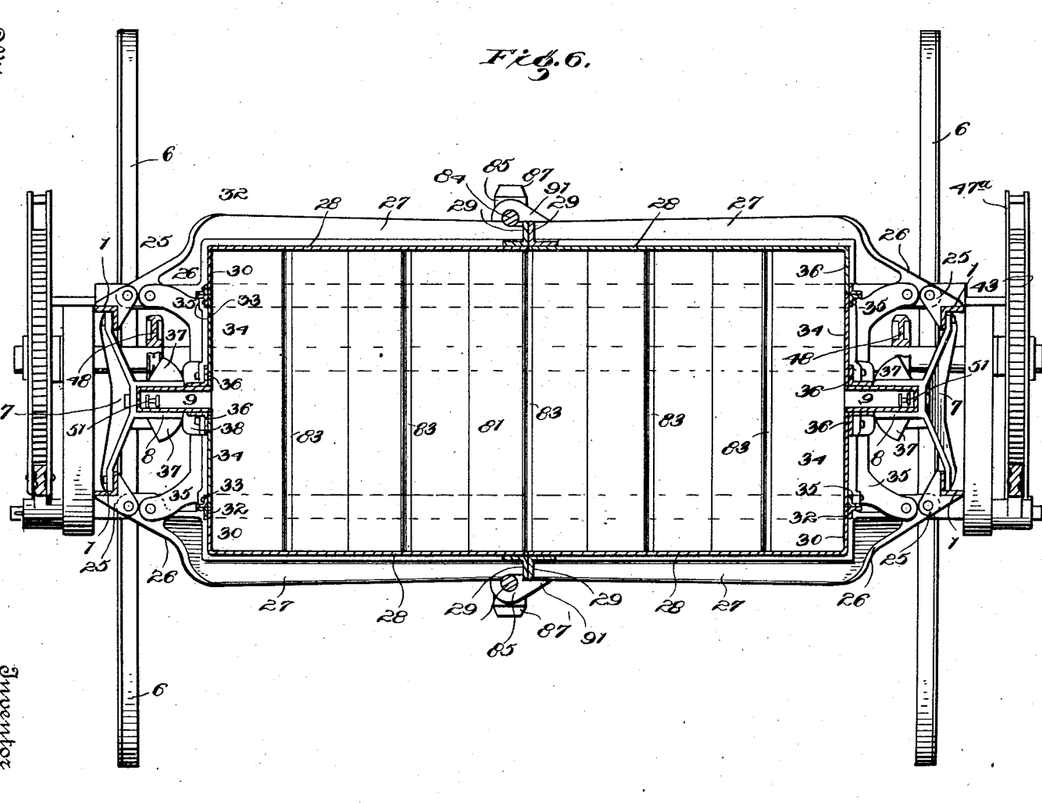
Fig. 6 is a horizontal sectional view, the body being shown closed.
Figure 7:
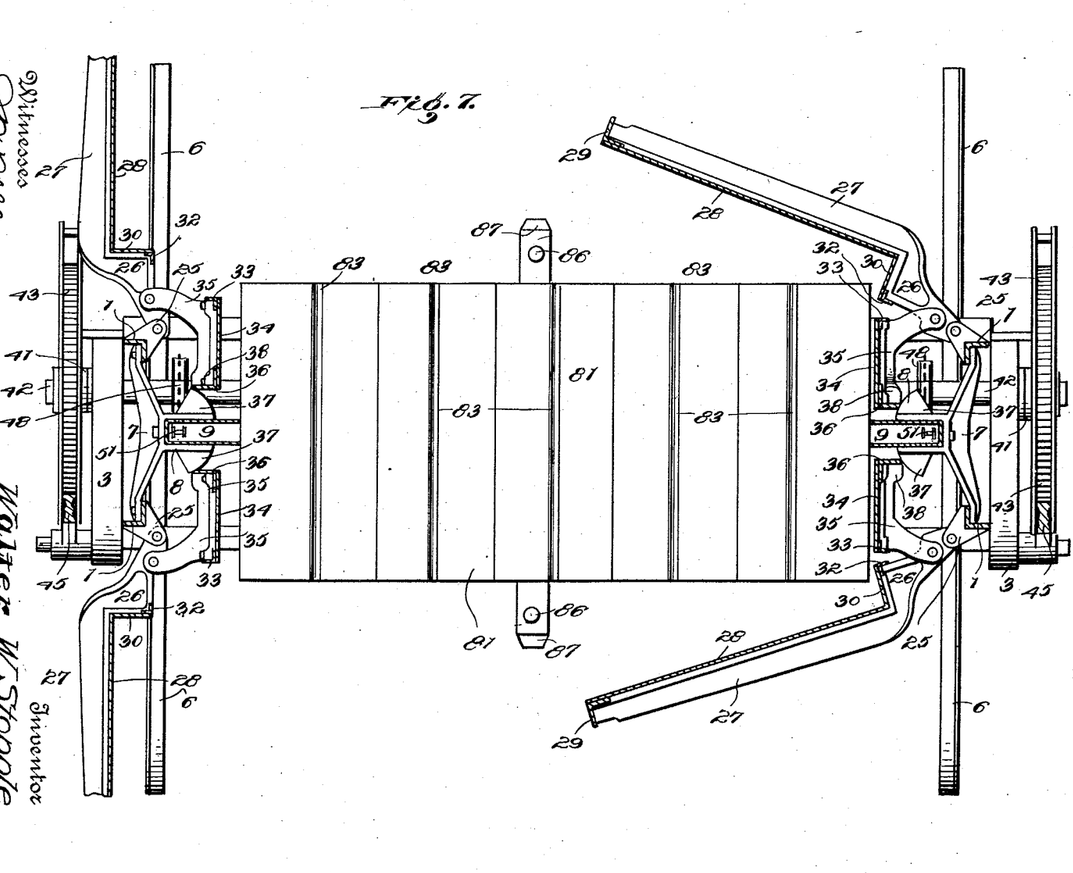
Fig. 7 is a similar view, the body being shown opened.
Figure 8:
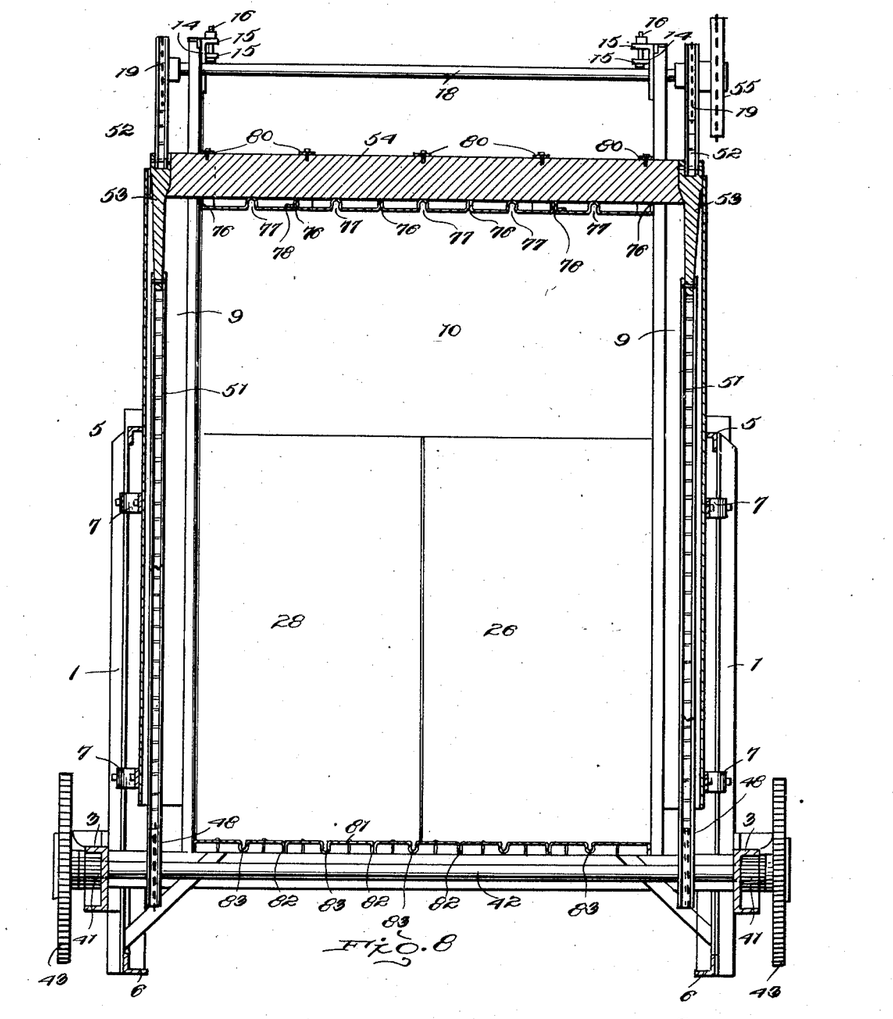
Fig. 8 is a longitudinal vertical sectional view.
Figure 9:
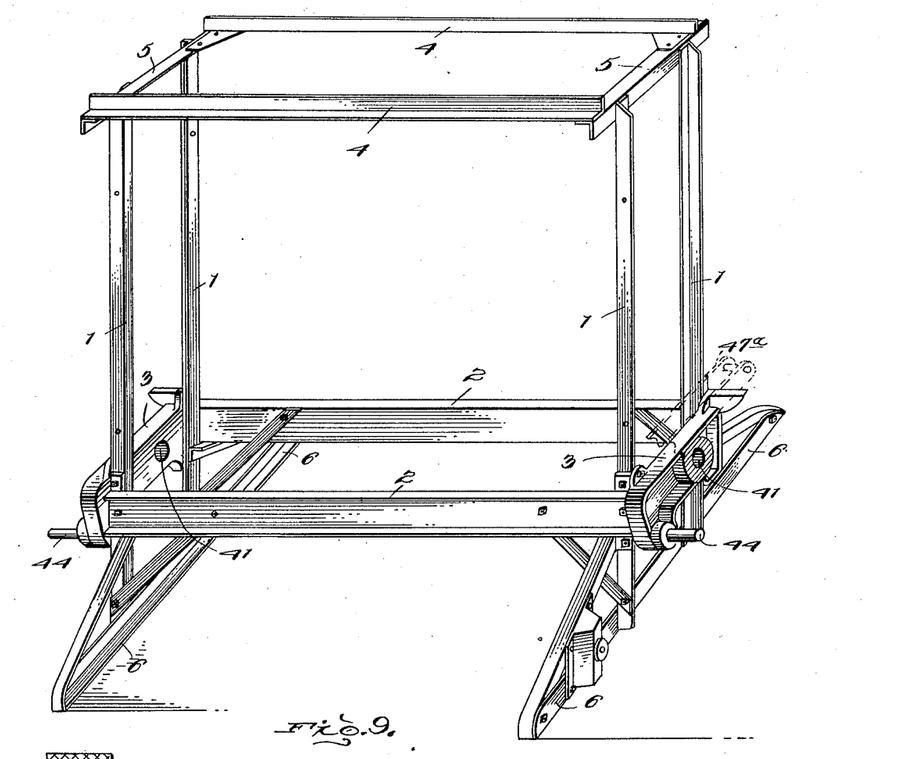
Fig. 9 is a detail perspective view of the supporting frame of the press.
Figure 10:
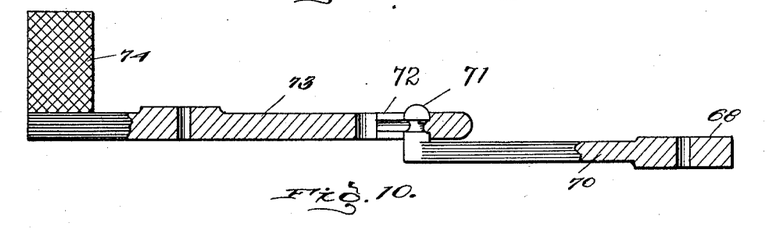
Fig. 10 is a detail view partly in elevation and partly in section of a foot lever for operating a controlling pawl.
Figure 11:
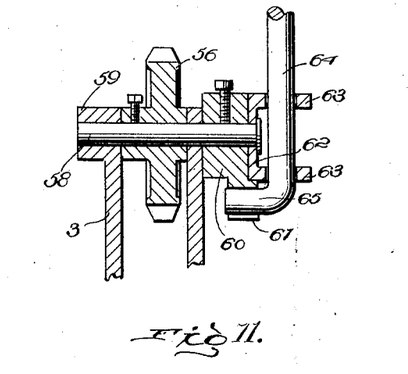
Fig. 11 is a detail fragmentary sectional view of part of the mechanism for initially operating the plunger.
Figure 12:
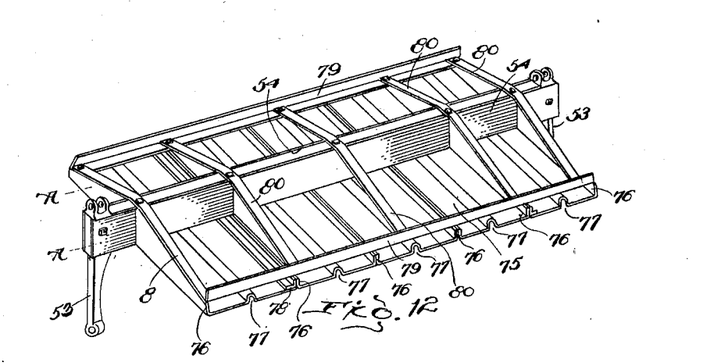
Fig. 12 is a perspective view of the plunger.
Figure 13:
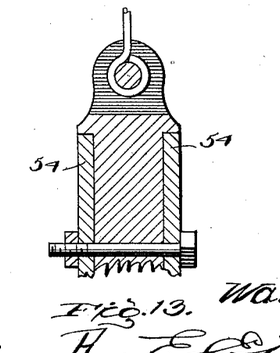
Fig. 13 is a fragmentary sectional view, taken on line A—A, Fig. 12.

Referring to the accompanying drawings by numerals, it will be seen that the improved baling press comprises a skeleton supporting frame that is formed of the corner standards 1 which are connected at their bases by the horizontal front and rear and end bars 2 and 3 and at their upper ends by the similar bars 4 and 5. The base bars 2 and 3 are preferably heavier than the upper bars 4 and 5, and said base bars have the feet 6 rigidly fastened thereto which rest on the floor or other supporting surface.

The standards 1 and the bars 2, 3, 4, and 5 in the present example are formed of angle metal which provides the flanges to which the body and the hopper are bolted, as will be presently explained, but it is to be understood, of course, that other types of bars may be employed when necessary or desirable.

The standards 1 at each end of the supporting frame are connected by the upper and lower horizontally arranged supporting bars 7 which are provided with the inwardly projecting sockets 8 in which the vertically arranged trough-shaped housings 9 are rigidly fastened. Said housings 9 extend from the base of the supporting frame to a point well above the top of said frame. The upper bars 4 of the supporting frame have the lower edge of the hopper 10 bolted or otherwise rigidly fastened thereto, the ends of said hopper being provided with vertical slots 11 into which the open sides of the housings 9 project. Said housings are bolted or otherwise rigidly fastened. The projected upper portions 12 of the ends of the hopper 10 have vertical slots 13 formed therein over which the blocks 14 are fastened and which carry the lugs 15 which are provided with threaded openings for the adjusting bolts 16. Said bolts engage the bearings 17 which are slidable in the slots 11. A shaft 18 is journaled in the bearings 17 and has its projecting ends equipped with the sprockets 19. The rear of the hopper is closed and the front open. A pair of wings or flanges 20 project laterally from the open front of the hopper, one wing being at each side thereof, and said wings project well beyond and overhang the front of the press. A vertically swinging door 21 is hinged to the base of the front of the hopper, said door filling the spaces between the wings 20 and is held in a closed position by means of a gravity latch 22 that is carried by a bar 23 that extends across the top of the hopper. The wings 20 are provided on their inner surfaces adjacent their lower outer ends with rests 24 which support the door 21 in a horizontal position when open. Obviously, when open, the door 21 forms a shelf which facilitates the placing of material in the press. The side wings 20 form the ends of the hopper, as will be clear, and are bolted or otherwise rigidly fastened to the upper portions of the housings 12.

The corner standards 1 carry upper and lower hinge ears 25, in which the angular ends 26 of the elongated bracket hinges 27 are pivotally mounted. Said bracket hinges overlap and are rigidly fastened to the outer surfaces of the front and rear doors 28. Said doors swing horizontally and are arranged in pairs, one pair at the front and the other pair at the rear. The free vertical edges of said doors are provided with angle strips 29 which abut when the doors are closed so that no crack or opening is left through which fire could pass. The opposite edges of said doors are bent at right angles to provide the vertical flanges 30, which are overlapped by the angular portions 26 of the bracket hinges 27, and said flanges overlap portions of the end corners of the skeleton supporting frame. The free vertical edges of said flange are equipped with angle bars 32 which abut similar bars 33 carried by the outer vertical edges of the movable end panels 34.

The end panels 34 are carried by the hinge brackets 35, the angular free ends of which are pivotally connected to the door bracket hinges 27 at points adjacent the connection of said door brackets with the standards 1. This manner of hinging the end panels 34 to the doors 28, causes the panels to swing away from the skeleton supporting frame when the doors are opening, and to swing close to the frame when said doors are being closed, so that when open, the pressure on the bale is released, and when closed, the bale is tightly embraced. The inner vertical edges of the panels 34 are equipped with the angle bars 36 which abut the outer side surface of the housings 9 so that the press is sealed at those points when the said panels are closed. The sockets 8 of the supporting bars 7 have the outer surface of their inner ends provided with cam surfaces 37 which are engaged by the lugs 38 at the inner ends of the brackets 35 and which act as guides for the panels when swinging to open or closed positions, and also serve as braces so that the panels will withstand the pressure of the material being baled. The upper end bars 5 of the supporting frame carry inwardly projecting sockets 39 on which the housings 9 are fastened, the ends of said sockets being secured to the hopper 10. The under surface of said sockets 39 are equipped with cam surfaces 40 which engage the upper end of the angle bars 36 carried by the panels 34 to assist the cams 37 in holding and guiding the said end panels.

The end bars 3 of the base of the supporting frame are provided with bearings 41 in which the power shaft 42 is mounted. The projected outer ends of said shaft 42 have the ratchet wheels 43 fast thereon. Pivot lugs 44 project laterally from the front portion of the bars 3 and have the cranks 45 mounted thereon. Said cranks are provided with sockets 46 for the elongated hand levers 47, and are also provided with pawls 47ª for engaging the ratchets 43, so that when the hand levers 47 are rocked, the pawls will rotate the ratchets and similarly actuate the power shaft 42. Said pawls are preferably formed of a pair of parallel straps which are pivotally connected to opposite sides of the cranks 45 and have their outer ends connected by a pivot bar. This arrangement provides loops which straddle the ratchets 43 so that the pawls are always in position to be operated by the levers 47 to actuate the said ratchets. Shaft 42 is also equipped with sprocket wheels 48 which are located beneath the housings 9 and in alinement with the sprockets 19 of upper shaft 18. The sprockets 19 and 48 are connected by chains, said chains being in two sections 51 and 52. Chain sections 51 are heavy ones and extend through the housings 9 and have one of their ends shackled to the pendent lugs 53 carried by the ends of a plunger beam 54 which extend into said housing. Said sections 51 pass around the sprockets 48 and are connected to the sections 52. The sections 52 are light ones and pass over the sprockets 19 and are connected to the upper ends of said lugs 53.

At one end, shaft 18 carries a sprocket 55 which has a chain connection 56 with a sprocket 57 mounted on a shaft 58 journaled in a bearing 59 carried by one of the end bars 5. Shaft 58 has a collar 60 fast thereon which is provided with a notch 61. A second collar 62 is loose on shaft 58 and is provided with spaced parallel hinge ears 63 in which a hand lever 64 is pivotally mounted. Said lever has an angular extension 65 at one end for engaging the notch 61 of collar 60 so that by rotating the lever, sprockets 55, 57 and chain 56 will rotate shaft 18 to raise the plunger. A hand grip 66 is carried by the free end of lever 64. A gravity pawl 67 is provided for normally locking sprocket 57 against a movement that raises the plunger.

Two of the hand levers 47 have been shown, one at each end of the press, and said levers are employed for rotating the chains 50 to cause the plunger to compress the material in the press. Said levers operate upon the heavy chain sections 51. A pawl 68 is pivotally mounted on a pin 69 projecting from the base of one end of the supporting frame and normally engages the adjacent ratchet wheel 43 to prevent reverse movement thereof. Said pawl is equipped with an arm 70 provided with a laterally projecting end lug 71 that is slidable in a longitudinal slot 72 formed in a foot lever 73. Said lever is pivotally connected to one of the feet of the press and equipped with a treadle 74 which facilitates the lever being rocked by the foot of an operator to release pawl 68 from the ratchet 43.

The plunger beam 54 may be of wood or other suitable material, but the plunger 75 carried thereby is preferably formed of sheets or plates of metal having upturned flanges 76 at their ends and intermediate grooves 77 which are parallel with said flanges 76. The flanges 76 of the plates abut when the plates are assembled and are suitably fastened together and reinforced by the angle strips 78. The outer ends of said plates are braced by the connecting bars 79, and said plates are further reinforced by the straps 80 that extend over and are fastened to the beam 54 and have their ends fastened to the bars 79. The grooves 77 are formed in the face of the plates of the plunger and facilitate the passing of the bale tying means over a bale.

The bottom 81 of the press is formed of sheets or plates of metal having end flanges 82 that are held in abutting relation by suitable fasteners. Each plate is provided with a groove 83 through which bale tying means are passed beneath a bale.

The body of the press is composed of the bottom 81, the front and rear sets of doors, and the end panels, and said doors are retained in locked positions by means of the vertically arranged upper and lower latching bolts 84 which are slidable in the lugs 85 and engage the openings 86 of the lugs 87 carried by the bars 2 and 4 of the supporting frame.

One door of each set of doors is equipped with the bolts 84, and said bolts are operated by the hand levers 88 that are pivoted to said doors and have their angular heads 89 provided with links 90 which are pivotally connected to said bolts. The lugs 87 are provided with lips 91 which overlap the edge flange of the adjacent door so that said door cannot be opened until the bolts 84 are released. The levers 88 are guided by and have a limited pivotal movement between the guide straps 92.

It will be seen that this press provides a body that expands when the doors are opened so that a bale can be readily removed. It will also be seen that simple means as provided for initially operating the plunger to "set" the same on the material to be pressed, after which simple compressing means are operated to cause the plunger to exert a great pressure on the material to form the same into a tight and compact bale.

The end lugs 53 of the plunger beam 54 depend in the form of rigid arms which form efficient means for attaching the chains 51 to said beam. Said arms snugly, but slidably fit within the housings 9, so that in the event the material fed into the press is not evenly placed, the plunger will not be tilted thereby. This arrangement provides simple guiding means for the plunger so that a bale of uniform density will be made.

What I claim as my invention is:—

1. A baling press comprising a support, a hopper carried thereby, doors hinged to said support, end panels formed of sections independently hinged to said doors, said doors and panels constituting an expansible body, and bale pressing mechanism coöperating with said body.

2. A baling press comprising a body composed of side doors and end panels formed of sections, and an independent hinge connection between said doors and said sections.

3. A baling press comprising side doors, sectional end panels, and hinge connections between the sections of said panels and doors, said door and ends forming a press body, and pressing means slidable in said body.

4. A baling press comprising a framework, side doors having a hinge connection therewith, end panels formed of sections having independent hinges connection with the hinges of said doors, and pressing means inclosed by said doors and said end sections.

5. A baling press comprising side doors and independently movable sectional ends, means connecting said sectional ends to said doors whereby a pivotal movement of said doors imparts a similar movement to said ends, and pressing means inclosed by said doors and ends.

6. A baling press comprising a support, hinges carried thereby, doors carried by said hinges, ends formed of sections independently pivotally connected to said hinges, said ends and doors forming an expansible press body, and pressing means slidably inclosed by said body.

7. A baling press comprising a supporting frame, upper and lower hinge ears carried by each corner thereof, doors carried by said ears, end panels formed of sections independently pivotally connected to said ears, said doors and ends forming an expansible press body, and pressing means slidably inclosed by said body.

8. A baling press comprising a supporting framework, hinge ears carried thereby and provided with elongated strap extensions, doors carried by said strap extensions, an auxiliary hinge ear carried by the first mentioned hinge ears, end sections carried thereby, and means carried by said framework for causing said end sections to move toward the center of the framework when the doors are rocked to a closed position.

9. A baling press comprising a substantially rectangularly shaped framework, doors hinged thereto, longitudinally arranged end sections pivotally connected to the hinge connections of said doors, the sections at each end of the framework being spaced apart, means carried by said framework and projecting between said sections to cause the same to move toward the center of said framework when rocked to a closed position, and pressing means inclosed by said end sections and doors.

10. A baling press comprising a support, hinge ears carried thereby, doors carried by said ears, spaced apart sectional ends pivotally connected to said doors, lugs carried by said support and having beveled surfaces that project between the sections of each end for guiding said sections toward the center of said support, and pressing means inclosed by said ends and doors.

11. A baling press comprising support, hinge ears carried thereby, sectional ends pivotally connected to said doors and adapted to be moved by a movement of said doors, and guiding means carried by said support for causing said sectional ends to swing toward the center of said support when closing.

12. A baling press comprising a body having slotted ends, a plunger therefor having a supporting beam that projects through said slotted ends, guide housings for said slots and means movable in said housings and engaging the ends of said beam for actuating the plunger.

13. A baling press comprising a support, a body composed of side doors and sectional ends, said doors and sectional ends having a hinge connection with said support whereby they may be rocked relatively to said support, and locking means carried by said doors and engaging said support to retain the body closed.

14. A bailing press comprising a support, doors hinged to each corner thereof, an end panel pivotally connected to each door, and locking means for the doors adapted to engage said support.

15. A baling press comprising a support, a pair of doors at each side of said support, overlapping means carried by one door for clamping the adjacent door when said doors are closed, and locking means carried by one door for engaging said support.

16. A bailing press comprising a body, a plunger slidable therein, endless means for operating said plunger, manually controlled means for operating the endless means for causing the plunger to exert a limited pressure on the material, being baled, and manually controlled means for operating said endless means to cause the plunger to exert a greater pressure on the material being baled.

17. A baling press comprising a support, housings carried by the ends thereof, a hopper carried by said support and fastened to said housings, doors hinged to said support, end panels hinged to said doors and adapted to clamp said housings when the doors are closed, a plunger having its ends slidable in said housings, chains extending through said housings and engaging the ends of said plunger, means for initially operating said chains to adjust the plunger, and independent means for operating said chains to cause the plunger to compress material with the press.

18. A baling press comprising a support, a hopper carried thereby, housings carried by the ends of said support, an expansible body comprising doors hinged to said support and end panels hinged to said doors, said panels provided with flanges for clamping engagement with said housings, a plunger having its ends slidable in said housings, and means movable through said housings for operating said plunger.

19. A baling press comprising a support, a body carried thereby, a hopper for said body, a power shaft journaled in said support, a shaft adjustably mounted above said hopper, means operated by said power shaft for rotating said adjustable shaft, a plunger operated by said means, and means for operating said power shaft.

20. A baling press comprising a support, a body carried thereby, a hopper therefor, a power shaft in said support, a shaft journaled above said hopper, sprocket connections between said shafts, a plunger movable in said hopper and body and operated by said sprocket connections, a stub shaft carried by said support, a collar fast thereon and provided with a notch, a collar loose on said stub shaft and provided with pivot ears, a hand lever loose in said ears and provided with an angular end for engaging said notch, a sprocket connection between the stub shaft and the hopper shaft, and means for rotating the power shaft.

21. A baling press comprising a support, a body carried thereby, a plunger in said body, a power shaft carried by said body, a ratchet wheel on said shaft, a crank pivotally connected to said support, a hand lever carried by said crank, a pawl carried by said crank for rotating said ratchet wheel, a pawl engaging said wheel to prevent rotation thereof, a foot treadle for releasing the same, means operated by said shaft for actuating said plunger, and means for operating the power shaft.

22. A baling press comprising a supporting frame including upper and lower horizontal front and rear bars, latching lugs carried by said bars, doors hinged to said frame, said doors arranged in pairs, one pair for the front and another pair for the rear of said frame, upper and lower latching bolts slidably mounted on one door of each pair of doors, hand levers having link connections with said bolts for causing said bolts to engage said lugs, end panels carried by said doors, said panels and doors constituting a press body, and pressing means in said body.

23. A baling press comprising a body composed of a plurality of separable side and end sections, and means connecting said sections in pairs and being capable of synchronously actuating said sections for moving the same to an open or a closed folded position.

24. A baling press, including a baling body composed of independent horizontally movable sections, said sections being movably connected in independent sets whereby the actuation of one section in one set will operate the remaining section or sections in the same set.

25. A baling press comprising a body, a plunger movably mounted in said body and provided with means extending beyond the lines of the body, said body provided with housing means normally inclosing or covering the extended portion of said plunger, and means connected to the extended portion of said plunger and within said housing means for moving the plunger within the body.

26. A baling press comprising a frame, a body carried by said frame, said body provided with openings, housing means carried by said frame and inclosing or covering said openings when the body is in an operable position, a plunger in said body provided with means extending into said housing means, and means in said housing means for actuating said plunger.

27. A baling press comprising a frame, a body carried by said frame, said body provided at opposite sides with plunger-guiding slots, housings on said frame and normally closing said slots, a plunger provided with extensions, said extensions projecting into said housings, and means in said housings and connected to said plunger extensions for moving the plunger in the body.

28. A baling press comprising a body including a section and a door, means connecting said section and door for moving the section upon the frame when the door is swung upon its pivot, and guiding means on said frame for positively directing the section to a closed or open position when the door is actuated.

29. A baling press comprising a frame carrying a baling body, said body provided with a horizontally movable section, and guiding means on said frame and coöperating with said section for positively directing the same to an open or a closed position.

30. A baling press comprising a frame, a body carried by said frame, said body provided with a hinged member, sliding locking means carried by said hinged member, a lever member pivotally connected to said sliding locking means, guiding means for said member, and means on said frame and adapted to be engaged by said sliding locking means for securing said hinged member in a fixed position upon said frame.

31. A baling press comprising a frame provided with doors, a bearing or lug-member on said frame, and means on one of said doors for simultaneously engaging said lug-member and also the other door for holding the doors in a closed position upon the frame.

32. A baling press comprising a frame, a baling body carried by said frame provided with doors, and means on said frame and one of the doors for synchronously locking the doors in a closed position upon the frame.

33. A baling press provided with a plunger, said plunger comprising a beam, plates positioned transversely of said beam, each plate provided with a tie-groove and with a flange, and means positioned longitudinally of said plunger and transversely of the plates for securing the flanges of said plates snugly together.

34. A baling press provided with a plunger, said plunger composed of a plurality of parallel plates, each plate provided with a tie-groove and a flange, and means resting upon all of the flanges for securing the plates together.

35. A baling press provided with a plunger, said plunger comprising a beam, plates secured transversely of said beam, bars secured to the plates near their outer ends, and means connected to the bars and extending across the beam for bracing the entire plunger.

36. A baling press provided with a plunger, said plunger comprising a beam, plates on one side of said beam, reinforcing means extending parallel with the beam and connecting the plates near their outer ends, and bracing means extending across the beam opposite to the plates and connected to the reinforcing means.

37. A baling press comprising a frame, a body carried by said frame and provided with guide housings at its ends, a plunger working in said body provided with projections at its ends that enter said housings, and flexible members secured to the projections only and movable in said housings and being capable of lifting or lowering the plunger within the body when drawn or pulled in a common direction.

38. A baling press comprising a frame, a body carried by said frame, said frame provided with guiding cam portions, said body provided with a member or section adapted when moved to engage said cam portions, said cam portions serving to uniformly direct the section to different adjusted positions when moved upon the frame with respect to the remaining portion of the body.

39. A baling press comprising a body, a plunger working therein, means including a ratchet wheel for operating said plunger, a pawl for holding said ratchet wheel against movement in one direction, an arm carried by said pawl and provided with a laterally projecting lug, and a foot treadle provided with a slot in which said lug is slidably mounted.

40. A baling press comprising a body, a plunger working therein, said plunger formed of a beam, transverse plates connected to the under-surface thereof, said plates provided with grooves through which bale ties are passed, reinforcing bars connecting the ends of said plates, straps passed over said beam and fastened to said bars, and means for operating said plunger.

41. A baling press comprising a body provided with longitudinally extending guide housings at its ends, a plunger in said body and provided with pendent end arms which are slidable in said housings, and means for operating said plunger.

In testimony whereof I hereunto affix my signature in presence of two witnesses.

WALTER W. STOPPLE.

Witnesses:
JUDSON C. LOSEY,
ROY L. ANDERSON.

---

Copies of this patent may be obtained for five cents each, by addressing the "Commissioner of Patents, Washington, D. C."